UNITED STATES PATENT OFFICE.

CHARLES R. ELFELDT, OF NEW YORK, N. Y.

FLUID FOR STRENGTHENING MANTLES OR HOODS FOR INCANDESCENT GAS-LAMPS.

SPECIFICATION forming part of Letters Patent No. 585,091, dated June 22, 1897.

Application filed April 8, 1897. Serial No. 631,241. (No specimens.)

*To all whom it may concern:*

Be it known that I, CHARLES R. ELFELDT, a citizen of the United States, and a resident of New York, in the county and State of New York, have invented certain new and useful Improvements in Fluids for Strengthening Mantles or Hoods for Incandescent Gas-Lamps, of which the following is a specification.

It is a well-known fact that the mantles or hoods for incandescent lamps must be hardened by means of a certain strengthening coating for the purpose of rendering the same fit to be handled and shipped. The composition of matter generally contains a certain quantity of photoxylin and trinitrocellulose, which ingredients are very injurious to the said mantles or hoods on account of their explosive qualities, as in flaming off the coating it very often happens that by the explosion of small particles of the coating adhering to the mantles or hoods the latter are destroyed.

The object of my invention is to produce a strengthening fluid for mantles or hoods for incandescent gas-lamps in which the explosive properties of photoxylin and trinitrocellulose are greatly decreased.

In preparing my strengthening fluid or coating I take four grams of photoxylin, one gram of trinitrocellulose, one-half gram of camphor-oil, one gram of washed sulfuric ether, five grams of acetomethyl, and one gram of acetone, and shake these ingredients until the photoxylin is dissolved. Then I add ten cubic centimeters of distilled water and stir the mixture thoroughly. The solution thus obtained is slowly dropped through a suitable faucet upon a smooth glass or other plate, on which the fluid is spread, and the water and a portion of the sulfuric ether are allowed to evaporate. The remainder of the fluid appears then on the plate as a hardened thin sheet, which is removed therefrom in shavings by means of a wooden knife or other suitable instrument. These shavings are then treated as follows: Ten grams of the said shavings are done into a solution of 0.5 grams of alcohol, 0.3 grams of camphor-oil, five hundred and thirty-five grams of acetomethyl, two grams of acetone, and 0.5 grams of vaseline, and the whole mixture thoroughly stirred and shaken until the shavings are entirely dissolved therein.

I am aware that photoxylin and trinitrocellulose have heretofore been used for strengthening fluids for the said purpose, but these fluids contain a comparatively large quantity of sulfuric ether, serving as a solvent for the photoxylin and trinitrocellulose. I substitute for the sulfuric ether acetomethyl, which is less explosive and less dangerous. By the employment of camphor-oil the photoxylin is dissolved without any sediment and the coating is more uniform.

The mantles or hoods for the incandescent gas-lamps impregnated with the incandescent medium are dipped into the solution, obtained as described, and are then dried, whereafter they possess the required degree of rigidity to render them fit to be handled and shipped.

It has been proved by several practical tests that by preparing the photoxylin and trinitrocellulose in the manner first above described and then treating the obtained shavings as pointed out afterward the said ingredients lose sixty-five per cent. of their explosive power. The strengthening coating is comparatively light and does not crack or injure the mantles by explosions in burning off the same, which is very often the case with a coating made of the highly-explosive photoxylin and trinitrocellulose dissolved in sulfuric ether.

Having thus described my invention, I claim as new and desire to secure by Letters Patent—

1. A fluid for strengthening mantles or hoods for incandescent gas-lamps, the same consisting of photoxylin, trinitrocellulose, camphor-oil, sulfuric ether, acetomethyl, acetone, alcohol, and vaseline, in the proportions set forth.

2. As an article of manufacture, a fluid for strengthening mantles or hoods for incandescent gas-lamps, containing photoxylin and trinitrocellulose dissolved in acetomethyl and camphor-oil in proportions set forth, substantially as set forth.

3. The described process of preparing a fluid for strengthening incandescent mantles or hoods which consists in making shavings of a dried solution of photoxylin, trinitrocellulose, camphor-oil, sulfuric ether, acetomethyl, acetone, and water, and then dissolving the shavings in alcohol, camphor-oil, acetomethyl, acetone and vaseline, in the proportions set forth.

Signed at New York, in the county and State of New York, this 1st day of April, A. D. 1897.

CHARLES R. ELFELDT.

Witnesses:
CHARLES KARP,
HARRY M. WILLNER.